(12) United States Patent
Kim et al.

(10) Patent No.: US 12,327,685 B2
(45) Date of Patent: Jun. 10, 2025

(54) MULTILAYER ELECTRONIC COMPONENT

(71) Applicant: SAMSUNG ELECTRO-MECHANICS CO., LTD., Suwon-si (KR)

(72) Inventors: Hyoung Uk Kim, Suwon-si (KR); Yun Kim, Suwon-si (KR); Hyung Soon Kwon, Suwon-si (KR); Kwang Hee Nam, Suwon-si (KR); Seok Hyun Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 151 days.

(21) Appl. No.: 18/227,563

(22) Filed: Jul. 28, 2023

(65) Prior Publication Data

US 2024/0339264 A1 Oct. 10, 2024

(30) Foreign Application Priority Data

Apr. 7, 2023 (KR) .......................... 10-2023-0045979

(51) Int. Cl.
  *H01G 4/12* (2006.01)
  *C04B 35/468* (2006.01)
  *H01G 4/30* (2006.01)

(52) U.S. Cl.
  CPC ....... *H01G 4/1227* (2013.01); *C04B 35/4682* (2013.01); *H01G 4/30* (2013.01);
  (Continued)

(58) Field of Classification Search
  None
  See application file for complete search history.

(56) References Cited

U.S. PATENT DOCUMENTS 11,569,037 B2 * 1/2023 Kang .................... H01G 4/1227
11,581,146 B2 * 2/2023 Kang ................ C04B 35/62807
(Continued)

FOREIGN PATENT DOCUMENTS

EP    1 128 404 A2    8/2001
EP      4443452 A2 * 10/2024  ........... C04B 35/468
(Continued)

OTHER PUBLICATIONS

Extended European search report dated Sep. 18, 2024 issued in corresponding European Application No. 23188916.3.

*Primary Examiner* — Dion R. Ferguson
(74) *Attorney, Agent, or Firm* — Morgan, Lewis & Bockius LLP

(57) ABSTRACT

A multilayer electronic component includes: a body including a dielectric layer including a plurality of dielectric grains and internal electrodes alternately disposed with the dielectric layer; and an external electrode disposed on the body and connected to the internal electrodes At least one of the plurality of dielectric grains includes Ba, Ti, Sn, and a rare earth element and has a core-dual shell structure, which includes a core, a first shell disposed on at least a portion of the core, and a second shell disposed on at least a portion of the first shell. When an average molar ratio of Sn to Ti included in the first and second shells is S1 and S2, respectively, and an average molar ratio of the rare earth element to Ti included in the first and second shells is R1 and R2, respectively, S1>S2 and R2>R1 are satisfied.

19 Claims, 6 Drawing Sheets

(52) U.S. Cl.
CPC .............. *C04B 2235/3206* (2013.01); *C04B 2235/3217* (2013.01); *C04B 2235/3225* (2013.01); *C04B 2235/3236* (2013.01); *C04B 2235/3262* (2013.01); *C04B 2235/3293* (2013.01); *C04B 2235/3418* (2013.01)

(56) References Cited

U.S. PATENT DOCUMENTS

| | | | |
|---|---|---|---|
| 2006/0216512 A1* | 9/2006 | Fujikawa | C04B 38/009 75/370 |
| 2018/0130601 A1 | 5/2018 | Kim et al. | |
| 2019/0066920 A1* | 2/2019 | Kim | C04B 35/4682 |
| 2020/0058444 A1* | 2/2020 | Cha | H01G 4/12 |
| 2021/0210288 A1* | 7/2021 | Kang | C04B 35/49 |
| 2021/0249192 A1* | 8/2021 | Kang | H01G 4/30 |
| 2022/0139632 A1 | 5/2022 | Kim et al. | |
| 2022/0189694 A1 | 6/2022 | Kim et al. | |
| 2022/0199326 A1* | 6/2022 | Kim | C04B 35/62821 |
| 2022/0301770 A1 | 9/2022 | Lee et al. | |
| 2022/0375688 A1* | 11/2022 | Yoon | H01G 4/12 |
| 2022/0399165 A1 | 12/2022 | Kim et al. | |
| 2023/0129225 A1* | 4/2023 | Kang | H01G 4/008 501/137 |
| 2024/0339264 A1* | 10/2024 | Kim | H01G 4/1227 |

FOREIGN PATENT DOCUMENTS

| | | | | |
|---|---|---|---|---|
| JP | 2001240466 A | * | 9/2001 | ........... C01G 23/006 |
| KR | 10-2018-0051760 A | | 5/2018 | |
| KR | 10-2021-0088910 A | | 7/2021 | |
| KR | 20210100952 A | * | 8/2021 | |
| KR | 10-2022-0086452 A | | 6/2022 | |
| KR | 10-2022-0088099 A | | 6/2022 | |
| KR | 10-2022-0131609 A | | 9/2022 | |
| KR | 10-2022-0167599 A | | 12/2022 | |

* cited by examiner

MULTILAYER ELECTRONIC COMPONENT

CROSS-REFERENCE TO RELATED APPLICATION(S)

This application claims benefit of priority to Korean Patent Application No. 10-2023-0045979 filed on Apr. 7, 2023 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various types of electronic products, such as an image display device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted, and may thus be used as a component of various electronic devices. There has been increasing demand for a multilayer ceramic capacitor to have a reduced size and higher capacitance as each of various electronic devices such as a computer, a mobile device, and the like have a reduced size and higher output.

In general, in a body of a multilayer ceramic capacitor, a dielectric layer including $BaTiO_3$-based as a main component and internal electrodes including a conductive metal are alternately stacked. Such a body should be sintered in a reducing atmosphere, and in this case, a material forming the dielectric layer should have reduction resistance.

Due to unique characteristics of oxides, when sintered in a reducing atmosphere, oxygen inside an oxide is released and oxygen vacancy and electrons may be generated, and a movement of oxygen vacancies causes a problem in that insulation resistance of the multilayer ceramic capacitor deteriorates.

In order to solve this problem, a method of suppressing generation of oxygen vacancies by adding a rare earth element to a dielectric layer may be considered. However, as a $5^{th}$ generation mobile communication technology (5G, Fifth-generation) has recently developed using a high frequency band, research for a multilayer ceramic capacitor having excellent high-temperature lifespan characteristics and a temperature coefficient of capacitance (TCC) according to a temperature, is required.

SUMMARY

An aspect of the present disclosure is to provide a multilayer electronic component having improved high-temperature lifespan characteristics.

An aspect of the present disclosure is to provide a multilayer electronic component satisfying X6S temperature characteristics.

An aspect of the present disclosure is to provide a multilayer electronic component having excellent room temperature permittivity.

However, the object of the present disclosure is not limited to the above, and will be more easily understood in the course of describing specific embodiments of the present disclosure.

According to an aspect of the present disclosure, provided is a multilayer electronic component, the multilayer electronic component including: a body including a dielectric layer including a plurality of dielectric grains and internal electrodes alternately disposed with the dielectric layer; and an external electrode disposed on the body and connected to the internal electrode, wherein at least one of the plurality of dielectric grains includes Ba, Ti, Sn, and a rare earth element and has a core-dual shell structure, the core-dual shell structure includes a core, a first shell disposed on at least a portion of the core, and a second shell disposed on at least a portion of the first shell, and when an average molar ratio of Sn to Ti included in the first and second shells is S1 and S2, respectively, and an average molar ratio of the rare earth element to Ti included in the first and second shells is R1 and R2, respectively, S1>S2 and R2>R1 are satisfied.

According to an aspect of the present disclosure, provided is a multilayer electronic component, the multilayer electronic component including: a body including a dielectric layer including a plurality of dielectric grains and internal electrodes alternately disposed with the dielectric layer; and an external electrode disposed on the body and connected to the internal electrode, wherein at least one of the plurality of dielectric grains includes Ba, Ti, Sn, and a rare earth element and has a core-dual shell structure, wherein the core-dual shell structure includes a core, a first shell disposed on at least a portion of the core, and a second shell disposed on at least a portion of the first shell, wherein when an average molar ratio of Sn to Ti included in the core, the first shell, and the second shell is Sc, S1, and S2, respectively, and an average molar ratio of the rare earth element to Ti included in the core, the first shell, and the second shell is Rc, R1 and R2, respectively, S1>S2, S1>Sc, R2>S2, R2>Sc and R2>Rc are satisfied.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
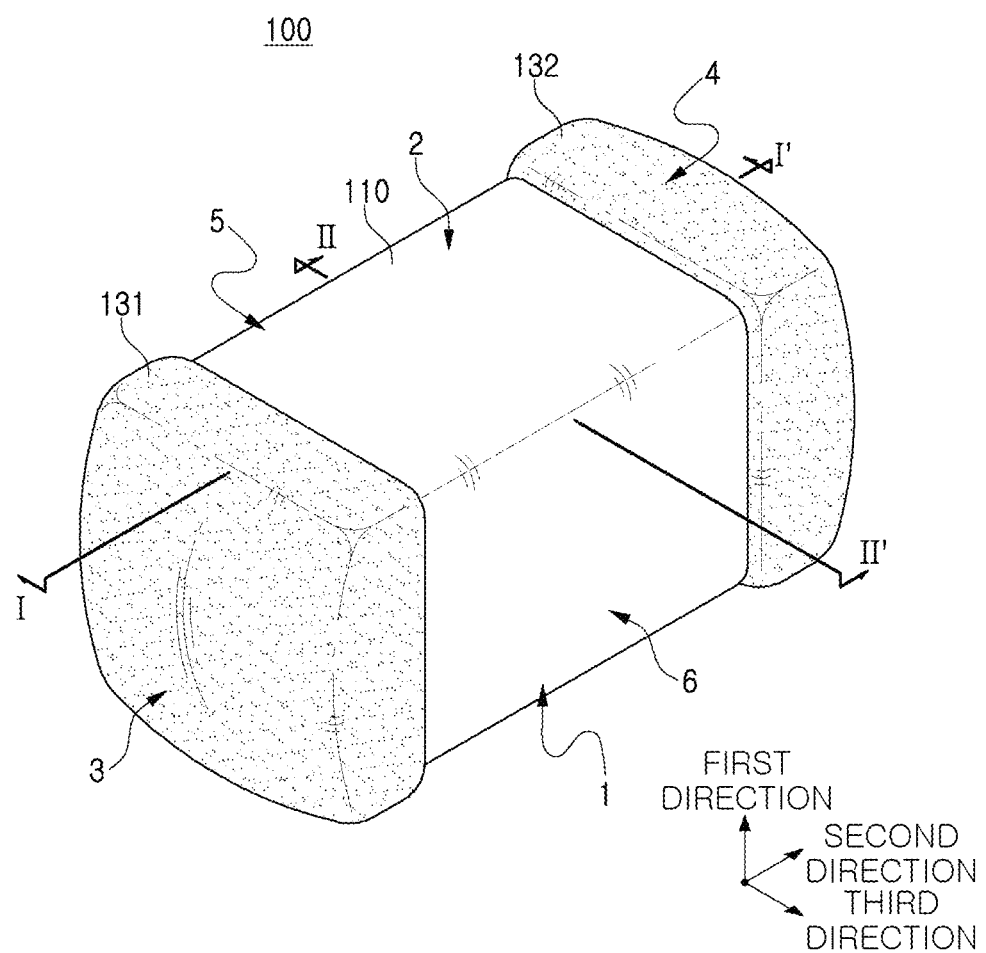
FIG. 1 is a perspective view schematically illustrating a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may refer to a thickness (T) direction, a second direction may refer to a length (L) direction, and a third direction may refer to a width (W) direction.

Multilayer Electronic Component

FIG. 1 schematically illustrates a perspective view of a multilayer electronic component according to an embodiment of the present disclosure.

Figure 2:
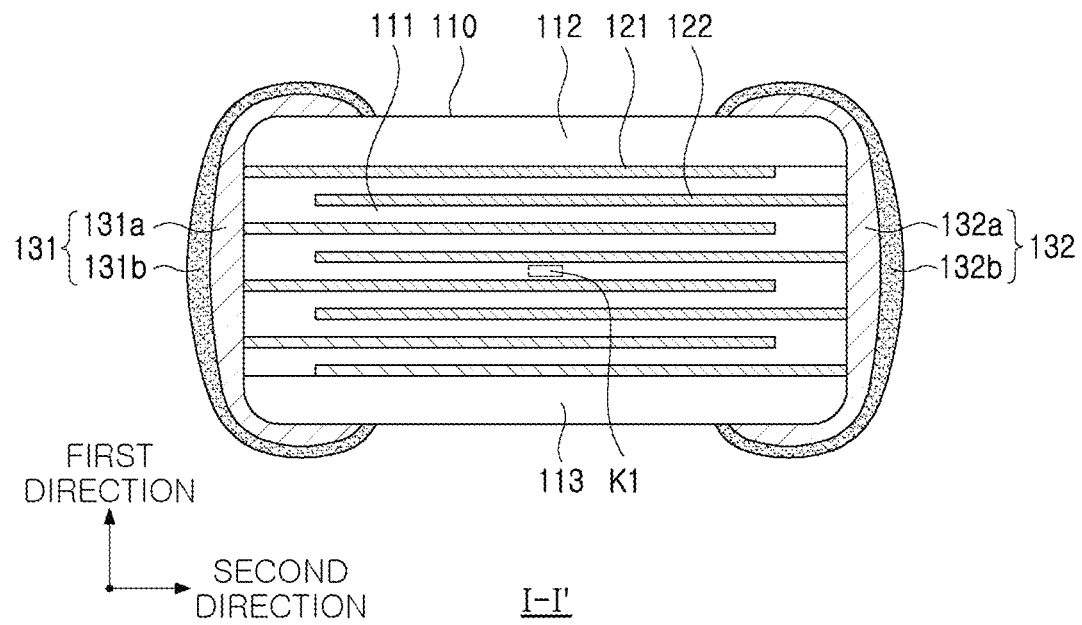
FIG. 2 is a cross-sectional view schematically illustrating a cut cross-section I-I' of FIG. 1.

FIG. 2 schematically illustrates a cross-sectional view taken along line I-I' of FIG. 1.

Figure 3:
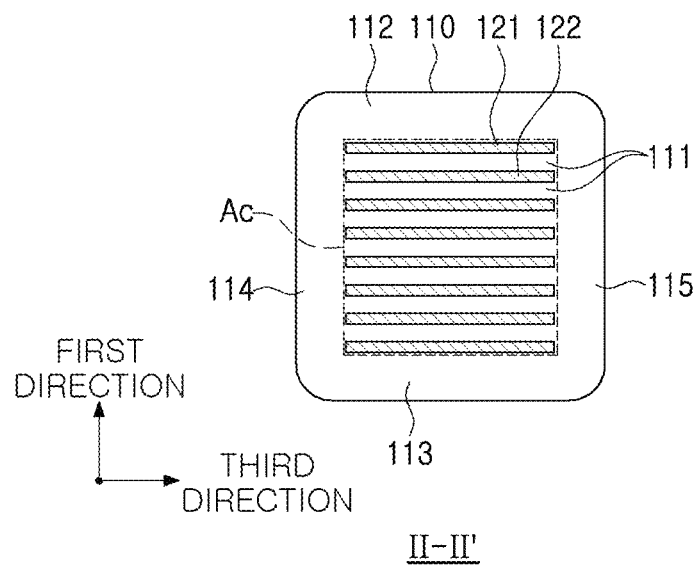
FIG. 3 is a cross-sectional view schematically illustrating a cut cross-section II-II' of FIG. 1.

FIG. 3 schematically illustrates a cross-sectional view taken along line II-II' of FIG. 1.

Figure 4:
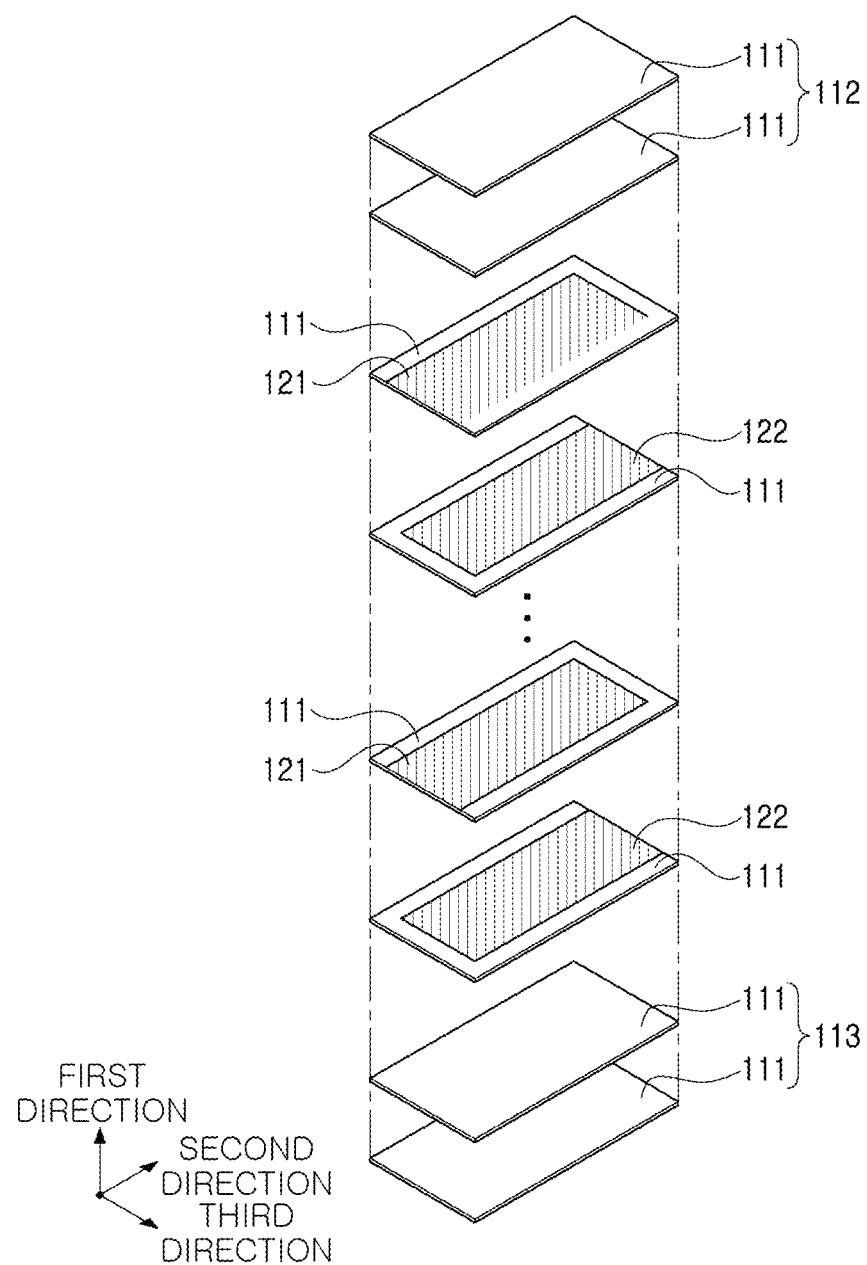
FIG. 4 is an exploded perspective view schematically illustrating an exploded body of a multilayer electronic component according to an embodiment of the present disclosure.

FIG. 4 is an exploded perspective view schematically illustrating an exploded body of FIG. 1.

Figure 5:
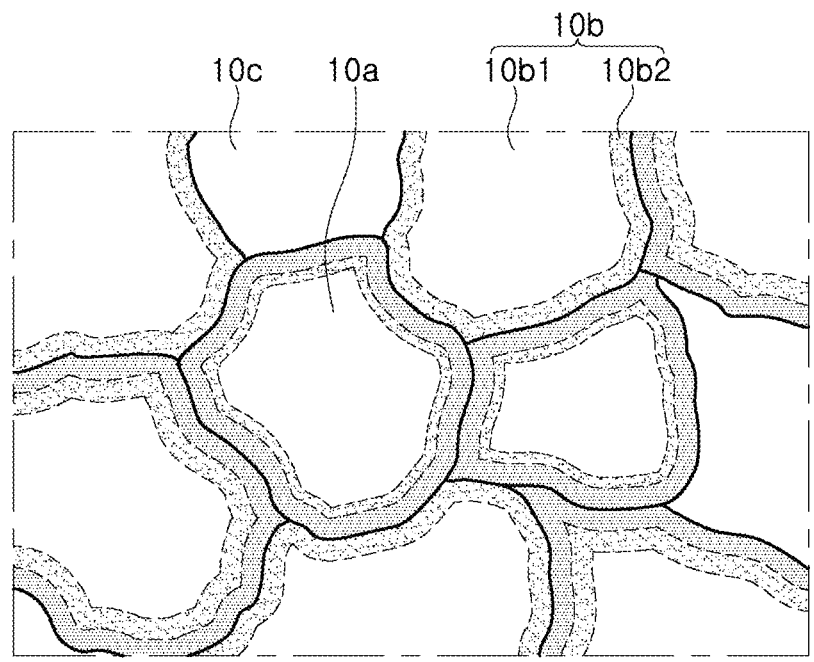
FIG. 5 is an enlarged view of the region K1 of FIG. 2.

FIG. 5 is an enlarged view of the region K1 of FIG. 1.

Figure 6:
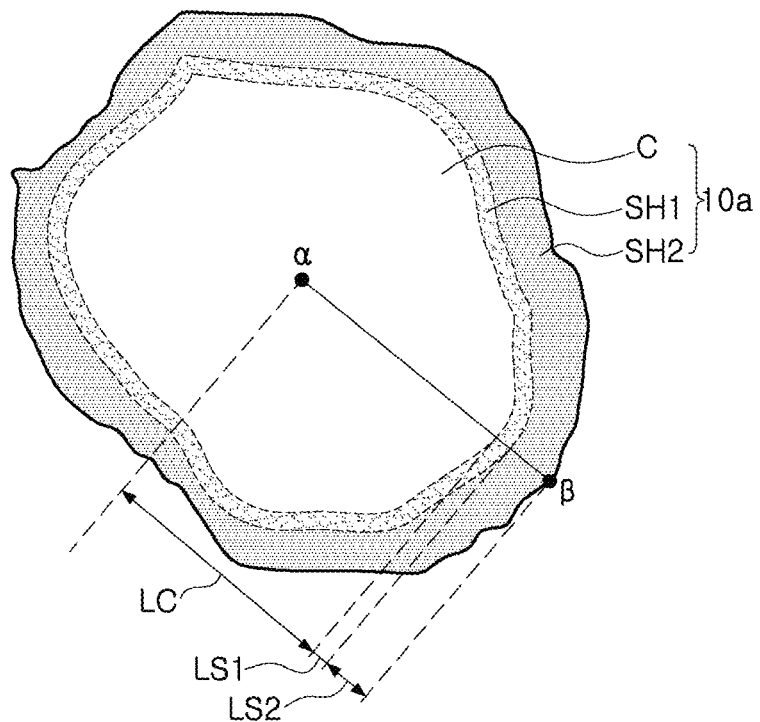
FIG. 6 schematically illustrates dielectric grains having a core-dual shell structure.

FIG. 6 schematically illustrates dielectric grains having a core-dual shell structure.

Figure 7:
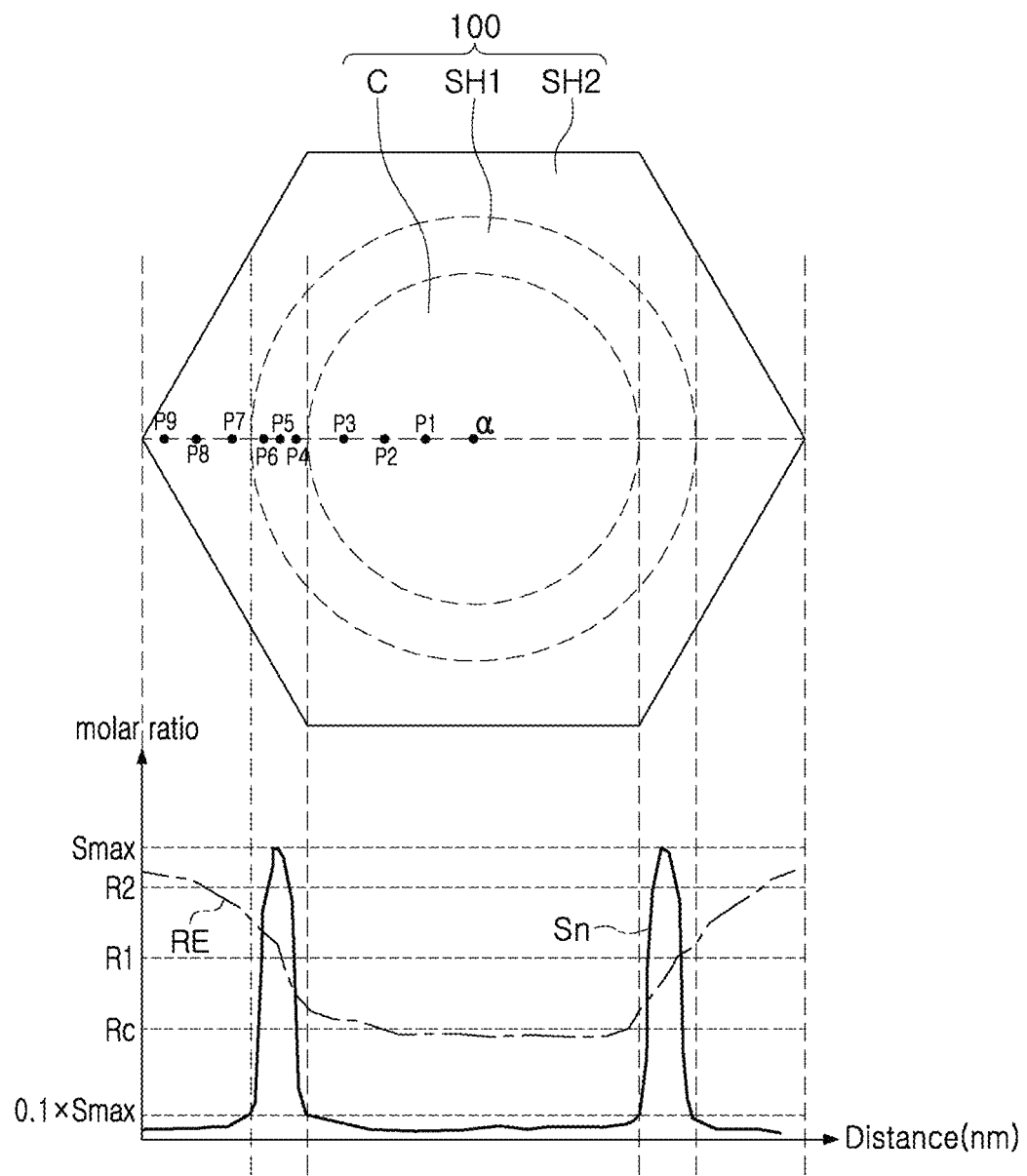
FIG. 7 schematically illustrates a molar ratio of Sn to Ti and a molar ratio of rare earth elements to Ti for each region of a dielectric grain having a core-dual shell structure.

FIG. 7 schematically illustrates a molar ratio of Sn to Ti and a molar ratio of rare earth elements to Ti for each region of dielectric grains having a core-dual shell structure.

Hereinafter, a multilayer electronic component 100 according to an embodiment in the present disclosure will be described with reference to FIGS. 1 to 7. In addition, a multilayer ceramic capacitor (hereinafter referred to as 'MLCC') will be described as an example of a multilayer electronic component, but the present disclosure is not limited thereto, and it may also be applied to various multilayer electronic components such as an inductor and piezoelectric elements, varistors, thermistors, or the like.

According to an aspect of the present disclosure, a multilayer electronic component 100 includes a body 110 including a dielectric layer 111 including a plurality of dielectric grains 10a, 10b, and 10c and internal electrodes 121 and 122 alternately disposed with the dielectric layer, and external electrodes 131 and 132 disposed on the body and connected to the internal electrodes, wherein at least one of the plurality of dielectric grains includes Ba, Ti, Sn, and rare earth elements and has a core-dual shell structure, the core-dual shell includes a core C, a first shell SH1 disposed on at least a portion of the core, and a second shell SH2 disposed on at least a portion of the first shell, and when an average molar ratio of Sn to Ti included in the first and second shells SH1 and SH2 are S1 and S2, respectively, and an average molar ratio of rare earth elements to Ti included in the first and second shells SH1 and SH2 are R1 and R2, respectively, S1>S2 and R2>R1 may be satisfied.

Although the detailed shape of the body 110 is not particularly limited, as illustrated, the body 110 may have a hexahedral shape or a shape similar thereto. Due to shrinkage of ceramic powder particles included in the body 110 during a sintering process or polishing of corners, the body 110 may not have a hexahedral shape with perfect straight lines, but may substantially have a hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

In the body 110, the dielectric layer 111 and internal electrodes 121 and 122 may be alternately stacked. A plurality of dielectric layers 111 forming the body 110 may be in a sintered state, and a boundary between adjacent dielectric layers 111 may be integrated to the extent that it is difficult to confirm without using a scanning electron microscope (SEM).

Referring to FIG. 5, the dielectric layer 111 includes a plurality of dielectric grains 10a, 10b, and 10c, and at least one of the plurality of dielectric grains includes Ba, Ti, Sn, and rare earth elements, and may be a dielectric grain 10a having a core-dual shell structure.

Referring to FIG. 6, the core-dual shell structure may include a core C, a first shell SH1 disposed on at least a portion of the core, and a second shell SH2 disposed on at least a portion of the first shell.

In a multilayer ceramic capacitor, one of multilayer electronic components, a problem in that insulation resistance may deteriorate due to movement of oxygen vacancies generated during sintering, may occur. In order to solve this problem, a method of forming a dielectric layer including dielectric grains having a core-shell structure by adding a rare earth element to a $BaTiO_3$-based main component may be considered. The rare earth element constitutes a shell region by substituting an A site or B site of a perovskite structure, which is basically represented by $ABO_3$, and this shell region may serve as a barrier to block a flow of oxygen vacancies to prevent leakage current.

However, as a $5^{th}$ generation mobile communication technology (5G) using a high frequency band has recently developed, the use environment of multilayer ceramic capacitors has become more severe. Accordingly, a multilayer ceramic capacitor satisfying X6S standards (change rate of capacitance is within ±22% in a temperature range of −55° C. to 105° C.) may not be stably provided with only dielectric grains having a simple core-shell structure.

On the other hand, in the multilayer electronic component 100 according to an embodiment of the present disclosure, the dielectric layer 111 may include a dielectric grain 10a having a core-dual shell structure including a core C, a first shell SH1 disposed on at least a portion of the core, and a second shell SH2 disposed on at least a portion of the first shell, and when an average molar ratio of Sn to Ti included in the first and second shells SH1 and SH2 is S1 and S2, respectively, and an average molar ratio of rare earth elements to Ti included in the first and second shells SH1 and SH2 is R1 and R2, respectively, S1>S2 and R2>R1 may be satisfied, so that a multilayer electronic component having high temperature lifespan characteristics and satisfying X6S standards may be provided.

The core C may perform a role of realizing capacitance of the multilayer electronic component 100 by maintaining permittivity. The core C may include at least one of $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, $Ba(Ti_{1-y}Zr_y)O_3$ $(0<y<1)$, and $(Ba_{1-x}Ca_x)(Ti_{1-y}Sn_y)O_3$ $(0<x<1, 0<y<1)$, in which calcium (Ca), zirconium (Zr), or the like, are partially dissolved in $BaTiO_3$, but the present disclosure is not limited thereto.

The first shell SH1 may include Sn. Sn is doped at the B-site of $BaTiO_3$ to increase band gap energy in which other rare earth elements diffuse into the dielectric grains. Accordingly, the first shell SH1 may serve as a barrier to suppress diffusion of other rare earth elements into the dielectric grains. Accordingly, withstand voltage and high-temperature reliability characteristics of the multilayer electronic component 100 may be improved.

The second shell SH2 may include a rare earth element. Here, the rare earth element may be at least one of La, Y, Ac, Ce, Pr, Nd, Pm, Sm, Eu, Gd, Tb, Dy, Ho, Er, Tm, Yb, and Lu, and more preferably at least one of Dy, Tb, Y, Gd, and Ho. The rare earth element included in the second shell SH2 may perform a role of suppressing generation of oxygen vacancies and lowering mobility of oxygen vacancies.

Meanwhile, according to an embodiment of the present disclosure, an average molar ratio S1 of Sn to Ti included in the first shell SH1 may be greater than an average molar ratio S2 of Sn to Ti included in the second shell SH2, and an average molar ratio R2 of rare earth elements to Ti included in the second shell SH2 may be greater than an average molar ratio R1 of rare earth elements to Ti included in the first shell SH1. Here, a molar ratio of the rare earth element to Ti may mean a ratio of the total number of moles of the rare earth element to the number of moles of Ti, for example, (Dy+Tb+Y+Gd+Ho/Ti) value based on the number of moles.

At least one of the plurality of dielectric grains 10a, 10b, and 10c may have a robust dual shell structure composed of a first shell SH1 and a second shell SH2 having different concentrations of Sn and rare earth elements, so that high temperature lift characteristics and TCC characteristics may be further improved.

A ratio of S1 and S2 is not particularly limited, but for example, $3<S1/S2\leq10$ may be satisfied. When S1/S2 is 3 or less, an effect of improving high-temperature lifespan or TCC characteristics may be insignificant. In addition, when S1/S2 is greater than 10, room temperature permittivity or TCC characteristics may be deteriorated.

The ratio of R1 and R2 is also not particularly limited, but for example, $4<R2/R1\leq12$ may be satisfied. When R2/R1 or less, high-temperature life is 4 characteristics may be deteriorated. When R2/R1 is greater than 12, a problem in that TCC characteristics are deteriorated may occur.

For example, in a cross-section taken in the first and second directions from a center of the body 110 in the third direction, S1, S2, R1, and R2 may be measured by performing line analysis on dielectric grains of a dielectric layer 111 located in a central region of the body 110 in the first and second directions through an energy disperse X-ray (EDS) installed in a transmission electron microscope (TEM).

First, as illustrated in FIG. 7, a molar ratio of Sn and rare earth elements RE to Ti may be illustrated in a graph by performing TEM-EDS line analysis in a long axis passing through a center (α) of a core-dual shell structure. In this case, a boundary between a first shell SH1 and a core C and a boundary between a first shell SH1 and a second shell SH2 may be defined as a point which is 10% of a maximum value (Smax) of a molar ratio of Sn to Ti included in the first shell SH1.

Based on the boundary, a molar ratio of Sn and rare earth elements to Ti at a plurality of equally spaced points (P4, P5, P6, . . . ) located in the first shell SH1, for example, at three equally spaced points may be measured and then averaging the same, respectively, so that S1 and R1 may be measured. In addition, a molar ratio of Sn and rare earth elements to Ti at a plurality of equally spaced points (P7, P8, P9, . . . ) located in the second shell SH2, for example, at three equally spaced points may be measured and then averaging the same, respectively, so that S2 and R2 may be measured. In addition, a molar ratio of Sn and rare earth elements to Ti at a plurality of equally spaced points (P1, P2, P3, . . . ) located at the core C, for example, at three equally spaced points may be measured and then averaging the same, respectively, so that an average molar ratio Sc of Sn to Ti included in the core C and an average molar ratio Rc of the rare earth element RE to Ti may be measured. In addition, when an average value is measured by extending the average value measurement to 10 or more dielectric grains 10a having a core-dual shell structure, a more generalized average molar ratio may be measured.

Referring to FIG. 7, a molar ratio of Sn to Ti included in the first shell SH1 may gradually decrease toward at least one of a boundary with the core C or a boundary with the second shell SH2 inside the first shell SH1. That is, a Sn concentration peak may be present in the first shell SH1. Since most of Sn is dissolved in the first shell SH1, Sn may barely be present in the core C and the second shell SH2, and S2 and Sc may be 0.1×Smax or less, respectively. Accordingly, S1 and Sc may satisfy S1>Sc. In addition, since Sn is barely present in the second shell SH2, S2 and R2 may satisfy R2>S2. Similarly, since Sn almost does not be present in the core C, R2>Sc can be satisfied.

The Sn concentration peak present in the first shell SH1 may serve as a barrier to suppress diffusion of the rare earth element RE into the dielectric grains, and accordingly, the rare earth element RE may not be present or only trace amounts thereof may be present in the core C. That is, R2>Rc can be satisfied.

As will be described later, the core-dual shell structure has the aforementioned Sn concentration gradient, which is because a ceramic slurry is formed by mixing $BaTiO_3$-based powder pre-doped with Sn and an additive containing a rare earth element, and a first shell SH1 is formed earlier than the second shell SH2 during a process of manufacturing and sintering a ceramic green sheet using the ceramic slurry.

Meanwhile, the dielectric grain 10a having a core-dual shell structure may further include other subcomponent elements as well as Sn and rare earth elements.

For example, the second shell SH2 of the dielectric grain 10a having a core-dual shell structure may include a first element. The first element may include at least one of a variable valence acceptor element and a fixed valence acceptor element. Here, the variable valence acceptor may include at least one of Mn, V, Cr, Fe, Ni, Co, Cu, and Zn, and the fixed valence acceptor may include at least one of Mg and Zr. The variable valence acceptor element and the fixed valence acceptor element may perform a role of reducing electron concentration, and may perform a role of improving sintering temperature lowering and high-temperature withstand voltage characteristics of the multilayer electronic component. A content of a first element included in the second shell SH2 may be 0.01 mol or more and 2.0 mol or less relative to 100 mol of Ti included in the second shell SH2, but the present disclosure is not limited thereto.

In addition, the second shell SH2 of the dielectric grain 10a having a core-dual shell structure may include a second element including at least one of Si and Al. The second element may perform a role of improving sintering temperature lowering and high-temperature withstand voltage characteristics of the multilayer electronic component. A content of a second element included in the second shell SH2 may be 0.5 mol or more and 4.0 mol or less relative to 100 mol of Ti included in the second shell SH2, but the present disclosure is not limited thereto. Meanwhile, the second shell SH2 may preferably further include at least one of Si, Al, Mn, and Mg among the first and second elements.

Referring to FIG. 5, the dielectric layer 111 may include dielectric grains 10b having a core-shell structure in addition to dielectric grains 10a having a core-dual shell structure. The dielectric grain 10b having a core-shell structure may include a core 10b1 and a shell 10b2 disposed on at least a portion of the core. In addition, the dielectric layer 111 may include dielectric grains 10c that do not have a separate shell.

A ratio of the number of dielectric grains 10a having the core-dual shell structure among the plurality of dielectric grains 10a, 10b, and 10c, may be, for example, 50% or more. The ratio of the number of dielectric grains 10a having a core-dual shell structure may be measured through an image obtained by scanning a cross-section of the dielectric layer 111 with a transmission electron microscope (TEM). When the number ratio of dielectric grains 10a having a core-dual shell structure is 50% or more, effects of improving high-temperature lifespan and TCC characteristics may be more remarkable.

Referring to FIG. 6, a first shell SH1 may be disposed to entirely cover a surface of the core C, and a second shell SH2 may be disposed to entirely cover a surface of the first shell SH1. However, the first shell SH1 may not cover a portion of a surface of a core C, and the second shell SH2 may be present in a form in which a portion of a surface of the first shell SH1 is not covered.

In this case, the first shell SH1 may be disposed to cover 90 area % or more of the surface of the core C, and the second shell SH2 may be disposed to cover 90 area % or more of the surface of the first shell SH1. When the first shell SH1 is disposed to cover 90 area % or more of the surface of the core and the second shell SH2 is disposed to cover 90 area % or more of the surface of the first shell SH1, effects of improving high-temperature lifespan and TCC characteristics according to the present disclosure may be more remarkable.

Lengths of the core C, the first shell SH1, and the second shell SH2 are not particularly limited, but, referring to FIG. 6, in a cross-section of the core-dual shell structure, when a center of the core-dual shell structure is defined as α, and when a point, farthest from the α, among surfaces of the second shell SH2, is defined as β, a length LC corresponding the core C among straight lines connecting the α and β may range from 70 nm to 100 nm. When the length LC corresponding to the core C among straight lines connecting the α and β is less than 70 nm, it may be difficult to implement target dielectric characteristics, and when the length LC exceeds 100 nm, DC-bias characteristics or reliability may be deteriorated.

In addition, a length LS2 corresponding to the second shell SH2 among the straight lines connecting the α and β may be greater than a length LS1 corresponding to the first shell SH1. When LS2>LS1 is satisfied, an effect of improving reliability according to the core-dual shell structure can be more remarkable.

In an embodiment, a length LS1 corresponding to the first shell SH1 among the straight lines connecting α and β may be 20 nm or less. When the LS1 is greater than 20 nm, dielectric characteristics are deteriorated. A lower limit of the LS1 is not particularly limited and may be greater than 0 nm.

In an embodiment, a length LS2 corresponding to the second shell SH2 among the straight lines connecting the α and β may be 25 nm or more and 50 nm or less. When the LS2 is less than 25 nm, an effect of improving reliability of the present disclosure may be insignificant. In addition, when the LS2 is greater than 50 nm, high-temperature lifespan characteristics or TCC characteristics may be deteriorated.

An average grain size of a plurality of dielectric grains 10a, 10b, and 10c is not particularly limited, but may be, for example, 130 nm to 300 nm. When the average grain size is less than 130 nm, it may be difficult to implement capacitance due to a decrease in dielectric constant, and when the average grain size exceeds 300 nm, reliability may be deteriorated due to a decrease in the number of dielectric grains per dielectric layer, and DC-bias characteristics may be deteriorated.

For example, the average grain size may mean an average value of sizes of dielectric grains, acquired by obtaining an image from a central region of the dielectric layer 111 with a scanning electron microscope (SEM) at a magnification of 50,000, in a cross-section of the body in the first and third directions, cut at a center in the third direction, and then analyzing the image using an image analysis program, for example, Zootos Program by Zootos.

An average thickness "td" of the dielectric layer 111 is not particularly limited, but may be, for example, 10 μm or less, and more preferably 0.6 μm to 2.0 μm. In general, as a thickness of the dielectric layer 111 decreases, reliability may decrease, and characteristics such as insulation resistance, breakdown resistance, and the like, may decrease. On the other hand, in the case of the multilayer electronic component according to an embodiment of the present disclosure, even when the average thickness "td" of the dielectric layer 111 is 0.6 μm to 2.0 μm, the core-dual shell structure described above is included in the dielectric grain 10a, reliability of the multilayer electronic component can be secured.

Here, the average thickness "td" of the dielectric layer 111 means a size of the dielectric layer 111 disposed between the internal electrodes 121 and 122 in the first direction. The average thickness of the dielectric layer 111 may be measured by scanning a cross-section of the body 110 in the first and second directions with a scanning electron microscope (SEM) at a magnification of 10,000. More specifically, an average value may be measured by measuring the thickness at a plurality of points of one dielectric layer 111, for example, at 30 points equally spaced in the second direction. The 30 equally spaced points may be designated in a capacitance formation portion Ac to be described later. In addition, when the average value is measured by extending this average value measurement to 10 dielectric layers 111, the average thickness of the dielectric layer 111 may be further generalized.

The internal electrodes 121 and 122 may be alternately disposed with the dielectric layer 111. For example, the first internal electrode 121 and the second internal electrode 122, which are a pair of electrodes having different polarities, may be disposed to face each other, with the dielectric layer 111 interposed therebetween. The plurality of first internal electrodes 121 and the plurality of second internal electrodes 122 may be electrically separated from each other by the dielectric layer 111 disposed therebetween.

The first internal electrode 121 may be spaced apart from the fourth surface 4 and disposed to be connected to the third surface 3. In addition, the second internal electrode 122 may be spaced apart from the third surface 3 and disposed to be connected to the fourth surface 4.

A conductive metal included in the internal electrodes 121 and 122 may be at least one of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

An average thickness "te" of the internal electrodes 121 and 122 is not particularly limited, but may be, for example, 3 μm or less. In addition, the average thickness "te" of the internal electrodes 121 and 122 may be arbitrarily set according to required characteristics or uses. For example, in the case of electronic components for high-voltage electric vehicles, the average thickness "te" of the internal electrodes 121 and 122 may be less than 1 μm, and in the case of small IT electronic components, the average thickness "te" of the internal electrodes 121 and 122 may be 0.4 μm or less to obtain miniaturization and high capacitance, but the present disclosure is not limited thereto.

The average thickness "te" of the internal electrodes 121 and 122 means a size of the internal electrodes 121 and 122 in the first direction. In this case, the average thickness of the internal electrodes 121 and 122 may be measured by scanning a cross-section of the body 110 in the first and second directions with a scanning electron microscope (SEM) at a magnification of 10,000. In more detail, an average value may be measured by measuring the thickness at a plurality of points of one of the internal electrodes 121 and 122, for example, at 30 points equally spaced in the second direction. The 30 equally spaced points may be designated in a capacitance formation portion Ac to be described later. In addition, when the average value is measured by extending this average value measurement to 10 internal electrodes 121 and 122, the average thickness of the internal electrodes 121 and 122 may be further generalized.

The body 110 may include a capacitance formation portion Ac disposed in the body 110 and including the first and second internal electrodes 121 and 122 alternately disposed with the dielectric layer 111 interposed therebetween to form capacitance, and a first cover portion 112 and a second cover portion 113, respectively disposed on both surfaces of the capacitance formation portion Ac, opposing each other in the first direction. The cover portions 112 and 113 may basically serve to prevent damage to the internal electrodes due to physical or chemical stress. The cover portions 112 and 113 may have the same configuration as the dielectric layer 111 except that they do not include internal electrodes.

An average thickness "tc" of the cover portions 112 and 113 is not particularly limited. However, the average thickness "tc" of the cover portions 112 and 113 may be 100 μm or less, 30 μm or less, or 20 μm or less, to reduce a size and increase capacitance of the multilayer electronic component. Here, the average thickness of the cover portions 112 and 113 means an average thickness of each of the first cover portion 112 and the second cover portion 113.

The average thickness of the cover portions 112 and 113 may mean an average size of the cover portions 112 and 113 in the first direction, and may be a value obtained by averaging sizes thereof in the first direction, measured at five equally spaced points in a cross-section of the body 110 in the first and second directions.

The body 110 may include a first margin portion 114 and a second margin portion 115 respectively disposed on both surfaces of the capacitance formation portion Ac in the third direction. The margin portions 114 and 115 may refer to a region between both ends of the internal electrodes 121 and 122 and a boundary surface of the body 110 in the cross-section of the body 110 cut in the first and third directions.

The margin portions 114 and 115 may include the same material as the dielectric layer 111 except that the internal electrodes 121 and 122 are not included. The margin portions 114 and 115 may basically serve to prevent damage to the internal electrodes 121 and 122 due to physical or chemical stress.

The margin portions 114 and 115 may be formed by coating and sintering a conductive paste for internal electrodes on the ceramic green sheet, except where the margin portion is to be formed. Alternatively, to suppress the step difference caused by the internal electrodes 121 and 122, the internal electrodes 121 and 122 are cut to be connected to the fifth and sixth surfaces 5 and 6 of the body after stacking, and then a single dielectric layer or two or more dielectric layers are stacked on both opposite surfaces of the capacitance forming portion Ac in the third direction, thereby forming the margin portions 114 and 115.

However, an average thickness of the margin portions 114 and 115 may be 100 μm or less, 30 μm or less, or 20 μm or less to reduce a size and increase capacitance of the multilayer electronic component. Here, the average thickness of the margin portions 114 and 115 refers to an average thickness of each of the first margin portion 114 and the second margin portion 115.

The average thickness of the margin portions 114 and 115 may refer to an average size of the margin portions 114 and 115 in the third direction, and may be a value obtained by averaging sizes thereof in the third direction, measured at five equally spaced points in a cross-section of the body 110 in the first and third directions.

The external electrodes 131 and 132 may be disposed on the third and fourth surfaces 3 and 4 of the body 110, and may extend onto portions of the first, second, fifth, and sixth surfaces 1, 2, 5 and 6. In addition, the external electrodes 131 and 132 may include a first external electrode 131 connected to the first internal electrode 121 and a second external electrode 132 connected to the second internal electrode 122.

The external electrodes 131 and 132 may be disposed on the third and fourth surfaces 3 and 4 of the body 110, and may include electrode layers 131a and 132a connected to the internal electrodes 121 and 122 and plating layers 131b and 132b disposed on the electrode layers. That is, the first external electrode 131 may be disposed on the third surface 3 and include a first electrode layer 131a connected to the first internal electrode 121 and a first plating layer 131b disposed on the first plating layer, and the second external electrode 132 may be disposed on the fourth surface 4 and include a second electrode layer 132a connected to the second internal electrode 122 and a second plating layer 132b disposed on the second electrode layer.

The electrode layers 131a and 132a may include conductive metal and glass. The conductive metal included in the electrode layers 131a and 132a may serve to secure electrical connectivity with the internal electrodes 121 and 122, and the glass may serve to improve bonding strength with the body 110.

It may be sufficient as long as the metal included in the electrode layers 131a and 132a has conductivity, and a specific material may be determined in consideration of electrical characteristics, structural stability, and the like. For example, the conductive metal included in the electrode layers 131a and 132a may include, for example, at least one of nickel (Ni), copper (Cu), palladium (Pd), silver (Ag), gold (Au), platinum (Pt), tin (Sn), tungsten (W), titanium (Ti), and alloys thereof, more preferably may include copper (Cu).

The electrode layers 131a and 132a may be composed of only a first layer including a conductive metal and glass, but the present disclosure is not limited thereto, and the electrode layers 131a and 132a may have a multilayer structure.

For example, the electrode layers 131a and 132a may include a first layer, which is a sintered electrode containing a conductive metal and glass and a second layer disposed on the first layer and containing a conductive metal and a resin. The second layer containing a conductive metal and a resin may serve to improve bending strength of the multilayer electronic component.

The metal included in the second layer is not particularly limited, and may include at least one of nickel (Ni), copper (Cu), palladium (Pd), silver (Ag), gold (Au), platinum (Pt), tin (Sn), tungsten (W), titanium (Ti), and alloys thereof.

The conductive metal included in the second layer may include at least one of a spherical powder particle and flake powder particle. That is, the conductive metal included in the second layer may be made of only flake powder particle or only spherical powder particle, or may be a mixture of flake powder particle and spherical powder particle. Here, the spherical powder particle may also include a shape that is not perfectly spherical, and may include a shape in which, for example, a length ratio between a major axis and a minor axis (major axis/minor axis) is 1.45 or less. The flake powder particle means a powder particle having a flat and elongated shape, and is not particularly limited, but, for example, a length ratio between a major axis and a minor axis (major axis/minor axis) thereof may be 1.95 or more. The lengths of the major and minor axes of the spherical powder particle and flake powder particle may be measured from an image obtained by scanning a cross-section of the multilayer electronic component cut in the first and second directions in a central portion thereof in the third direction with a scanning electron microscope (SEM).

The resin included in the second layer may serve to secure bonding properties and absorb shocks. The resin is not particularly limited as long as it has bonding properties and shock absorption and can be mixed with conductive metal powder to make a paste. For example, the resin may include at least one selected from an epoxy resin, acrylic resin, ethyl cellulose, and the like.

In addition, the second layer may include a plurality of metal particles, an intermetallic compound, and a resin. As the second layer includes the intermetallic compound, electrical connectivity with the first layer may be further improved. The intermetallic compound may serve to improve electrical connectivity by connecting a plurality of metal particles, and may serve to surround and connect the plurality of metal particles to each other.

In this case, the intermetallic compound may include a metal having a melting point lower than a curing temperature of the resin. That is, since the intermetallic compound includes a metal having a melting point lower than the curing temperature of the resin, the metal having a melting point lower than the curing temperature of the resin is melted during a drying and curing process, and forms an intermetallic compound with a portion of metal particles to surround the metal particles. In this case, the intermetallic compound may preferably include a metal having a low melting point of 300° C. or lower.

In an embodiment, the second layer may include Sn. Sn melts in the drying and curing process, the molten Sn wets metal particles having a high melting point such as Ag, Ni or Cu by capillary action, and reacts with a portion of Ag, Ni or Cu metal particles to form intermetallic compounds such as $Ag_3Sn$, $Ni_3Sn_4$, $Cu_6Sn_5$, $Cu_3Sn$, and the like.

Accordingly, the plurality of metal particles may include at least one of Ag, Ni, and Cu, and the intermetallic compound may include at least one of $Ag_3Sn$, $Ni_3Sn_4$, $Cu_6Sn_5$, and $Cu_3Sn$.

The plating layers 131b and 132b may improve mounting characteristics. The type of the plating layers 131b and 132b is not particularly limited, and may be a plating layer including nickel (Ni), tin (Sn), palladium (Pd), and/or alloys including the same, and may be formed of a plurality of layers. The plating layers 131b and 132b may be, for example, a Ni plating layer or a Sn plating layer, or may have a form in which a Ni plating layer and a Sn plating layer are sequentially formed. In addition, the plating layers 131b and 132b may include a plurality of Ni plating layers and/or a plurality of Sn plating layers.

In the drawings, a structure in which the multilayer electronic component 100 has two external electrodes 131 and 132 is described, but the present disclosure is not limited thereto, and the number or shape of the external electrodes 131 and 132 may be changed according to the shape of the internal electrodes 121 and 122 or other purposes.

Hereinafter, a method of manufacturing a multilayer electronic component 100 will be described.

First, ceramic powder for forming the dielectric layer 111 is prepared. The ceramic powder may be, for example, $BaTiO_3$ powder. $BaTiO_3$ may generally be synthesized by reacting a titanium raw material such as titanium dioxide with a barium raw material such as barium carbonate. Methods for synthesizing $BaTiO_3$ include, for example, a solid phase method, a sol-gel method, a hydrothermal synthesis method, and the like.

Next, $SnO_2$ may be preferentially added to the synthesized ceramic powder, and then the Sn-doped ceramic powder and an additive containing a rare earth element may be mixed. The additive may include an oxide containing at least one of La, Y, Ac, Ce, Pr, Nd, Pm, Sm, Eu, Gd, Tb, Dy, Ho, Er, Tm, Yb and Lu, Mn, V, Cr, Fe, Ni, Co, Cu, and an oxide containing one or more of Zn, Mg, and Zr, and/or an oxide containing at least one of Al and Sn.

Since $BaTiO_3$ is preferentially doped with Sn, a first shell SH1 with a high molar ratio of Sn to Ti may be first formed on a core C containing a $BaTiO_3$-based main component in a grain growth process of a dielectric grain 10a, and a second shell SH2 having a high molar ratio of rare earth elements to Ti may be formed thereafter.

Next, after drying and grinding the prepared ceramic powder, a ceramic slurry may be prepared by mixing an organic solvent such as ethanol and a binder such as polyvinyl butyral, and a ceramic green sheet may be prepared by coating and drying the ceramic slurry onto a carrier film.

Next, an internal electrode pattern may be formed by printing a conductive paste for internal electrodes including a conductive metal, a binder, or the like to a predetermined thickness by on a ceramic green sheet using a screen printing method, a gravure printing method, or the like.

Thereafter, the ceramic green sheet on which the internal electrode pattern is printed is peeled off from a carrier film, and then the ceramic green sheets on which the internal electrode pattern is printed are stacked by a predetermined number of layers so that the internal electrode patterns may be alternately exposed to both ends of a chip after cutting in the second direction, so that the stacked ceramic green sheet are cut to have a predetermined chip size.

A binder included in the cut chip, or the like may be preferably removed through a binder removal process. Conditions of the binder removal process may vary depending on the type of binder used, and the conditions are not particularly limited. For example, the binder removal process may be performed at 180° C. or higher and 450° C. or lower for a time of 0.5 hours or more and 24 hours or less. Thereafter, a body 110 including the dielectric layer 111 and the internal electrodes 121 and 122 may be formed by sintering the chip subjected to the binder removal process at a temperature of 1100° C. or higher and 1300° C. or lower.

Next, the third and fourth surfaces 3 and 4 of the body 110, where the internal electrodes 121 and 122 are exposed, may be dipped in a conductive paste for external electrodes containing a conductive metal and glass and then sintered, so that electrode layers 131a and 132a may be formed. Alternatively, the electrode layers 131a and 132a may be formed by transferring a sheet containing a conductive metal and glass. In addition, when the electrode layers 131a and 132a are composed of a first layer as a sintered electrode containing a conductive metal and glass and a second layer containing a conductive metal and a resin, a process of applying and curing a conductive resin composition containing a conductive metal and a resin on the first layer may also be further included.

A method of forming plating layers 131b and 132b is not particularly limited, and for example, the plating layers 131b and 132b may be formed using an electrolytic plating method and/or an electroless plating method.

EXPERIMENTAL EXAMPLE

Reliability Evaluation for Each Size of Sample Chip

Figure 8:
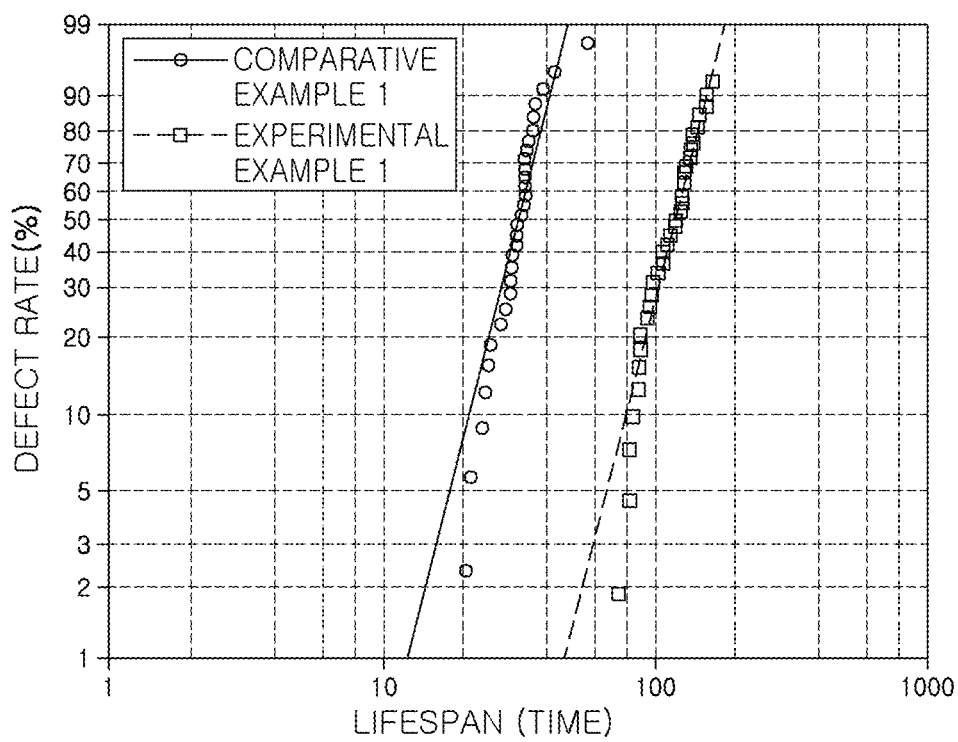
FIGS. 8 and 9 are graphs illustrating results of accelerated life evaluation (HALT) of Experimental Examples and Comparative Examples.
Figure 9:
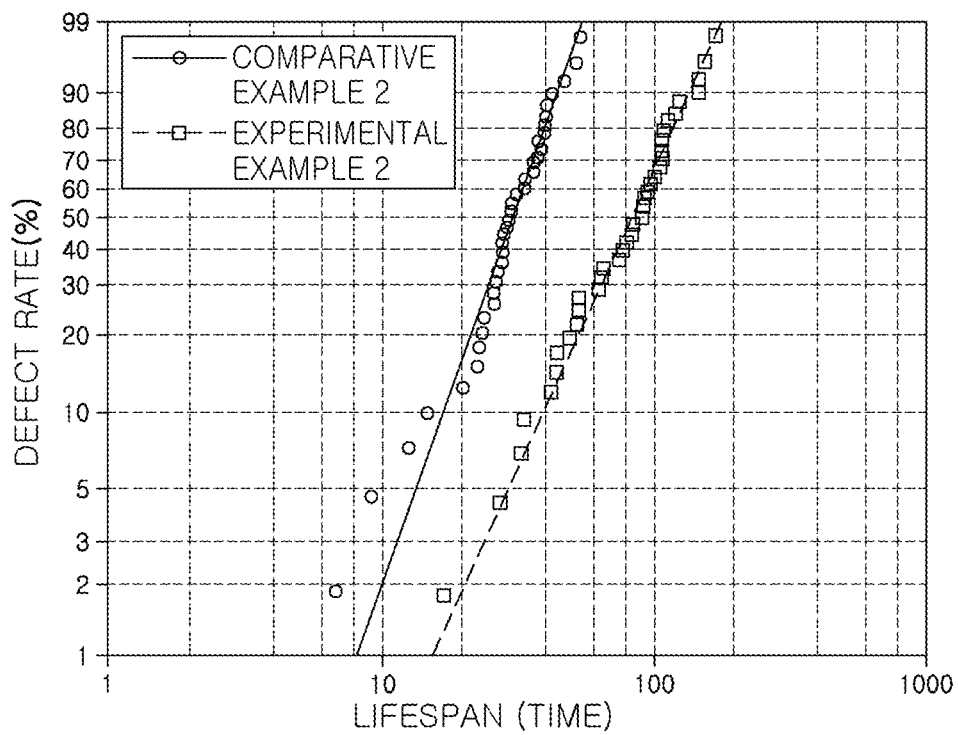

FIGS. 8 and 9 are graphs illustrating a result of accelerated life evaluation (HALT) of Experimental Examples and Comparative Examples.

First, $SnO_2$ was added to $BaTiO_3$, and then an additive including an oxide including Dy, Tb, Y, Gd, and Ho and an oxide including Si, Al, Mn, and Mg were mixed.

Next, after drying and pulverizing the prepared $BaTiO_3$ powder, a ceramic slurry was prepared by mixing an organic solvent such as ethanol and a binder such as polyvinyl butyral, and then the ceramic slurry is applied on a carrier film and dried to prepare a ceramic green sheet.

Next, internal electrode patterns were formed by printing a conductive paste for internal electrodes containing Ni powder, a binder, and the like, to a predetermined thickness on a ceramic green sheet, and the ceramic green sheet having the internal electrode patterns formed thereon was stacked and cut. Next, after forming a body 110 by performing a binder removal process and a sintering process, third and fourth surfaces 3 and 4 of the body 110 were dipped in a conductive paste for external electrodes containing a conductive metal and glass, and then sintered, to form electrode layers 131a and 132a, and plating layers 131b and 132b in which an Ni plating layer and an Sn plating layer are sequentially formed on the electrode layers, were formed to prepare a sample chip of Experimental Example.

In this case, a sample chip of Comparative Example was manufactured in the same manner as the sample chip of Experimental Example, except that a process in which $BaTiO_3$ was not pre-doped with Sn.

FIGS. 8 and 9 are graphs illustrating a result of accelerated life evaluation (HALT) of Experimental Examples and Comparative Examples.

Specifically, in Example 1 and Comparative Example 1 of FIG. 8, a sample chip was formed by the above-described method, but a thickness of a dielectric layer after sintering ranges from 0.6 to 0.9 µm, and a size of the sample chip in a second direction was about 0.6 mm, and a size thereof in a third direction was about 0.3 mm.

In Experimental Example 2 and Comparative Example 2 of FIG. 9, a sample chip was formed by the above-described method, but a thickness of a dielectric layer after sintering ranges from 1.3 to 2.0 µm, and a size of the sample chip in a second direction was about 1.0 mm, and size of the sample chip in a third direction was about 0.5 mm.

In the accelerated life evaluation, a lifespan for 40 samples of each of Experimental Example 1, Comparative Example 1, Experimental Example 2, and Comparative Example 2 was measured under conditions of a temperature of 125° C. and 2×Vr (rated voltage).

Referring to FIGS. 8 and 9, it can be confirmed that Experimental Example 1 and Experimental Example 2 are superior in reliability to Comparative Example 1 and Comparative Example 2. In the case of Experimental Example 1 and Experimental Example 2, this is because $BaTiO_3$ is pre-doped with Sn, to include dielectric grains 10a having a robust dual shell structure composed of a first shell SH1 and a second shell SH2 having different concentrations of Sn and rare earth elements.

Characteristics Evaluation According to S1/S2 and R2/R1

Next, characteristics of a sample chip according to values of S1/S2 and R2/R1 were evaluated. That is, the sample chip was manufactured in the above-described method, but an amount of $SnO_2$ and rare earth oxides doped into $BaTiO_3$ were adjusted. Specifically, the S1/S2 value was adjusted by changing an amount of Sn doped in $BaTiO_3$ between 0.8 and 3.0 moles relative to 100 moles of Ti for each sample number in Table 1 below, and the R2/R1 value was adjusted by changing an amount of the rare earth elements between 0.8 and 2.0 moles relative to 100 moles of Ti.

Thereafter, in a cross-section of the body 110 cut in the first and second directions from a center thereof in the third direction, the dielectric grains of the dielectric layer 111 located in a central region thereof in the first and second directions were observed with a transmission electron microscope (TEM) under conditions of an acceleration voltage of 200 kV, an observation magnification of 79000, and a beam diameter of 1.5 nm, and then line analysis was performed through an EDS installed in the transmission electron microscope. In this case, S1 and R1 were measured by measuring a molar ratio of Sn and rare earth elements RE to Ti at three equally spaced points located in the first shell SH1 and then averaging the same, respectively, and S2 and R2 were measured by measuring a molar ratio of Sn and rare earth elements RE to Ti at three equally spaced points located in the second shell SH2 and then averaging the same, respectively, to obtain S1/S2 and R2/R1 values. In addition, the S1/S2 and R2/R1 values were further generalized by measuring an average value thereof by extending the average value measurement to 10 dielectric grains 10a having a core-dual shell structure. Other measurement methods and/or tools appreciated by one of ordinary skill in the art, even if not described in the present disclosure, may also be used.

In Table 1 below, a case in which the S1/S2 value was 3 or less, which was indicated with "−", a case in which the S1/S2 value was greater than 3 and 10 or less, which was indicated with "o", and a case in which the S1/S2 value was greater than 10, which was indicated with "+", and a case in which the R2/R1 value was 4 or less, which was indicated with "−", a case in which the R2/R1 value was greater than 4 and 12 or less, which was indicated with "o", and a case in which the R2/R1 value was greater than 12, which was indicated with "+".

Room temperature capacitance and a dielectric loss (DF, dissipation factor) were measured by performing a heat treatment of the sample chip at 150° C. and after 2 hours, under the conditions of at 1 kHz and AC 1.14 V/μm using an LCR meter. Thereafter, the room temperature permittivity was obtained through the measured room temperature capacitance and a permittivity formula, and then listed in Table 1 below.

For whether or not X6S is satisfied, TCC at −55° C. and TCC at 125° C. were measured and then, when the TCC at −55° C. and 125° C. falls within a range of ±22%, which was indicated with "o", and when the TCC does not fall within a range of ±22%, which was indicated with "X".

In addition, a mean time to failure (MTTF) in Table 1 below means an average value of a time at which an insulation resistance measurement value of all sample chips is 1 kΩ or less by applying a temperature of 125° C. and a voltage twice a rated voltage to 400 sample chips for each sample number.

For whether DC effective capacitance is satisfied, when a DC voltage was applied under 100 khz, 0.01V, and 60 second holding conditions, when a capacitance value at a voltage of 1V is 80% or more of the capacitance under DC non-applied conditions, which was indicated with "o", and when it was less than 80%, which was indicated with "X".

Thereafter, four characteristics: 1) room temperature permittivity≥3000, 2) whether or not X6S is satisfied, 3) MTTF≥45, 4) whether or not DC effective capacitance is satisfied, a case in which the four characteristics were all satisfied was determined to be excellent (o), a case in which two to three conditions thereof were satisfied, was determined to be normal (Δ), and when one or less thereof was satisfied, it was determined to be defective (X), which was listed in Table 1 below.

perature permittivity and DC effective capacitance decrease, and the TCC characteristic decreases.

On the other hand, referring to Sample Nos. 2-1 to 2-3, it can be confirmed that when S1/S2 is greater than 3 and less than or equal to 10, room temperature permittivity and DC effective capacitance are excellent, and both high-temperature life characteristics and TCC characteristics are improved.

Further, referring to Sample Nos. 1-1 to 1-3 and Sample Nos. 3-1 to 3-3, it can be confirmed that when values of S1/S2 are similar, as values of R2/R1 increases, the high temperature life characteristics are improved, but the TCC characteristics are deteriorated.

However, referring to Sample No. 2-2, it can be confirmed that when both 3<S1/S2≤10 and 4<R2/R1≤12 are satisfied, the room temperature permittivity, effective DC capacitance, and TCC characteristics are secured and the high-temperature lifespan characteristics are remarkably improved.

As set forth above, as one of the various effects of the present disclosure, a multilayer electronic component having improved life characteristics at high temperatures may be provided.

As one of the various effects of the present disclosure, a multilayer electronic component satisfying X6S temperature characteristics may be provided.

As one of the various effects of the present disclosure, a multilayer electronic component having an excellent room temperature permittivity may be provided.

Although the embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

In addition, the expression 'one embodiment' used in the present disclosure does not mean the same embodiment, and is provided to emphasize and describe different unique characteristics. However, one embodiment presented above is not excluded from being implemented in combination

TABLE 1

| | | | | Chip characteristics | | | | | |
|---|---|---|---|---|---|---|---|---|---|
| Sample No. | S1/S2 | R2/R1 | Room temperature permittivity | DF(%) | TCC(%) (−55° C.) | TCC(%) (105° C.) | Whether or not X6S is satisfied | MTTF (hrs) | Whether or not DC effective capacitance is satisfied | Determination of characteristics |
| 1-1 | − | − | 3510 | 4.30 | −18.10 | −18.20 | o | 32 | o | Δ |
| 1-2 | − | o | 3460 | 4.35 | −19.25 | −22.11 | X | 48 | o | Δ |
| 1-3 | − | + | 3340 | 4.41 | −21.22 | −24.80 | X | 52 | o | Δ |
| 2-1 | o | − | 3430 | 3.60 | −18.65 | −20.14 | o | 42 | o | Δ |
| 2-2 | o | o | 3400 | 3.75 | −20.11 | −20.11 | o | 115 | o | o |
| 2-3 | o | + | 3220 | 4.10 | −21.15 | −26.80 | X | 85 | o | Δ |
| 3-1 | + | − | 2650 | 2.35 | −21.50 | −22.70 | X | 64 | X | X |
| 3-2 | + | o | 2420 | 2.45 | −22.80 | −29.11 | X | 81 | X | X |
| 3-3 | + | + | 2308 | 2.57 | −23.30 | −32.50 | X | 85 | X | X |

Referring to Sample Nos. 1-1 to 1-3 in Table 1 above, when S1/S2 is 3 or less, it can be confirmed that high temperature life characteristics (MTTF) are deteriorated and TCC characteristics (X6S) are deteriorated according to the R2/R1 value.

In addition, referring to Sample Nos. 3-1 to 3-3, it can be confirmed that when S1/S2 is greater than 10, room tem-with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer including a plurality of dielectric grains and internal electrodes alternately disposed with the dielectric layer; and
an external electrode disposed on the body and connected to the internal electrodes,
wherein at least one of the plurality of dielectric grains includes Ba, Ti, Sn, and a rare earth element and has a core-dual shell structure,
the core-dual shell structure includes a core, a first shell disposed on at least a portion of the core, and a second shell disposed on at least a portion of the first shell, and
when an average molar ratio of Sn to Ti included in the first and second shells is S1 and S2, respectively, and an average molar ratio of the rare earth element to Ti included in the first and second shells is R1 and R2, respectively, S1>S2 and R2>R1 are satisfied.

2. The multilayer electronic component of claim 1, wherein the S1 and S2 satisfy $3<S1/S2\leq10$.

3. The multilayer electronic component of claim 1, wherein the R1 and R2 satisfy $4<R2/R1\leq12$.

4. The multilayer electronic component of claim 2, wherein the R1 and R2 satisfy $4<R2/R1\leq12$.

5. The multilayer electronic component of claim 1, wherein the S2 and R2 satisfy R2>S2.

6. The multilayer electronic component of claim 1, wherein a molar ratio of Sn to Ti included in the first shell gradually decreases toward at least one of a boundary with the core or a boundary with the second shell from an inside of the first shell.

7. The multilayer electronic component of claim 1, wherein the rare earth element is at least one of Dy, Tb, Y, Gd, or Ho.

8. The multilayer electronic component of claim 1, wherein the second shell further comprises at least one of Si, Al, Mn, V or Mg.

9. The multilayer electronic component of claim 1, wherein, in a cross-section of the core-dual shell structure, when a center of the core-dual shell structure is defined as α, and when a point, farthest from the α among surfaces of the second shell, is defined as β,
a length corresponding to the core among straight lines connecting the α and β ranges from 70 nm to 100 nm.

10. The multilayer electronic component of claim 1, wherein, in a cross-section of the core-dual shell structure, when a center of the core-dual shell structure is defined as α, when a point, farthest from the α among surfaces of the second shell, is defined as β, and
when a length corresponding to the first shell is LS1 and a length corresponding to the second shell is LS2, among the straight lines connecting the α and β,
LS2>LS1 is satisfied.

11. The multilayer electronic component of claim 10, wherein the LS1 is greater than 0 nm and less than 20 nm.

12. The multilayer electronic component of claim 10, wherein the LS2 is 25 nm or more and 50 nm or less.

13. The multilayer electronic component of claim 1, wherein an average molar ratio of Sn to Ti included in the core is Sc and an average molar ratio of the rare earth element to Ti included in the core is Rc, S1>Sc and R2>Rc is satisfied.

14. The multilayer electronic component of claim 1, wherein an average thickness of the dielectric layer ranges from 0.6 μm to 2.0 μm.

15. A multilayer electronic component, comprising:
a body including a dielectric layer including a plurality of dielectric grains and internal electrodes alternately disposed with the dielectric layer; and
an external electrode disposed on the body and connected to the internal electrodes,
wherein at least one of the plurality of dielectric grains includes Ba, Ti, Sn, and a rare earth element and has a core-dual shell structure,
wherein the core-dual shell structure includes a core, a first shell disposed on at least a portion of the core, and a second shell disposed on at least a portion of the first shell,
wherein when an average molar ratio of Sn to Ti included in the core, the first shell, and the second shell is Sc, S1, and S2, respectively, and an average molar ratio of the rare earth element to Ti included in the core, the first shell, and the second shell is Rc, R1 and R2, respectively,
S1>S2, S1>Sc, R2>S2, R2>Sc and R2>Rc are satisfied.

16. The multilayer electronic component of claim 15, wherein the S1 and S2 satisfy $3<S1/S2\leq10$.

17. The multilayer electronic component of claim 15, wherein the R1 and R2 satisfy $4<R2/R1\leq12$.

18. The multilayer electronic component of claim 16, wherein the R1 and R2 satisfy $4<R2/R1\leq12$.

19. The multilayer electronic component of claim 15, wherein a molar ratio of Sn to Ti included in the first shell gradually decreases toward at least one of a boundary with the core or a boundary with a second shell from an inside of the first shell.

* * * * *